(12) United States Patent
Takikawa et al.

(10) Patent No.: US 8,910,762 B2
(45) Date of Patent: Dec. 16, 2014

(54) CENTRIFUGAL-PENDULUM VIBRATION ABSORBING DEVICE

(75) Inventors: Yoshihiro Takikawa, Anjo (JP); Kazuto Maruyama, Anjo (JP); Kazuhiro Itou, Anjo (JP); Koji Maeda, Anjo (JP)

(73) Assignee: Aisin AW Co., Ltd., Anjo-shi (JP)

( * ) Notice: Subject to any disclaimer, the term of this patent is extended or adjusted under 35 U.S.C. 154(b) by 288 days.

(21) Appl. No.: 13/337,913

(22) Filed: Dec. 27, 2011

(65) Prior Publication Data

US 2012/0168270 A1 Jul. 5, 2012

(30) Foreign Application Priority Data

Dec. 29, 2010 (JP) .................................. 2010-294401
Dec. 29, 2010 (JP) .................................. 2010-294404

(51) Int. Cl.
*F16F 7/10* (2006.01)
*F16H 45/02* (2006.01)
*F16F 15/14* (2006.01)

(52) U.S. Cl.
CPC .............. *F16F 15/145* (2013.01); *F16H 45/02* (2013.01); *F16H 2045/0263* (2013.01)
USPC ........................... 188/378; 74/574.2; 464/180

(58) Field of Classification Search
USPC ............. 188/378; 464/3, 68.2, 180; 192/3.28, 192/30 V, 212; 74/574.2, 574.4, 570.2; 416/144, 145
See application file for complete search history.

(56) References Cited

U.S. PATENT DOCUMENTS

| 5,666,862 | A | 9/1997 | Eckel et al. | |
|---|---|---|---|---|
| 6,450,065 | B1 * | 9/2002 | Eckel et al. | 74/574.4 |
| 8,161,740 | B2 * | 4/2012 | Krause et al. | 60/338 |
| 8,435,123 | B2 * | 5/2013 | Bai et al. | 464/68.2 |
| 8,561,499 | B1 * | 10/2013 | Schiemann et al. | 188/378 |
| 2011/0099992 | A1 * | 5/2011 | Magerkurth et al. | 60/435 |
| 2011/0179782 | A1 * | 7/2011 | Huegel et al. | 60/338 |
| 2012/0031226 | A1 * | 2/2012 | Jung | 74/574.4 |
| 2012/0055281 | A1 * | 3/2012 | Huegel | 74/574.2 |
| 2012/0080280 | A1 * | 4/2012 | Takikawa et al. | 192/3.28 |
| 2012/0305358 | A1 * | 12/2012 | Maienschein et al. | 192/3.28 |

(Continued)

FOREIGN PATENT DOCUMENTS

DE 10224874 A1 * 12/2002
DE 102006028556 A1 1/2007

(Continued)

OTHER PUBLICATIONS

International Search Report for corresponding International Patent Application No. PCT/JP2011/080096 mailed Apr. 3, 2012.

*Primary Examiner* — Thomas J Williams
*Assistant Examiner* — Mariano Sy
(74) *Attorney, Agent, or Firm* — Sughrue Mion, PLLC

(57) ABSTRACT

A centrifugal-pendulum vibration absorbing device, including a member attached coaxially with a rotary element; and mass bodies swingably coupled to the support member and disposed adjacent to each other in a circumferential direction. The mass bodies are configured such that when a first mass body, which is one of two mass bodies disposed adjacent to each other, and a second mass body, which is the other of the two mass bodies, move with respect to the support member so as to approach each other, the first mass body and the second mass body overlap each other as seen from an axial direction of the rotary element.

11 Claims, 12 Drawing Sheets

(56) References Cited

U.S. PATENT DOCUMENTS

| | | |
|---|---|---|
| 2013/0150169 A1* | 6/2013 | Krause et al. .................... 464/51 |
| 2013/0233124 A1* | 9/2013 | Wysgol et al. ................ 74/574.2 |
| 2013/0239745 A1* | 9/2013 | Maienschein et al. ....... 74/574.2 |

FOREIGN PATENT DOCUMENTS

| | | | |
|---|---|---|---|
| DE | 102007029609 | * | 1/2009 |
| DE | 102009024743 | A1 | 1/2010 |
| EP | 1744074 | A2 | 1/2007 |
| EP | 1780434 | A2 * | 5/2007 |
| FR | 1000629 | A | 2/1952 |
| GB | 2413613 | A | 11/2005 |
| JP | 03-140652 | A | 6/1991 |
| JP | 07-190146 | A | 7/1995 |
| WO | WO 2010/066665 | A2 | 6/2010 |
| WO | WO 2010105589 | A1 * | 9/2010 |

* cited by examiner

F I G. 1
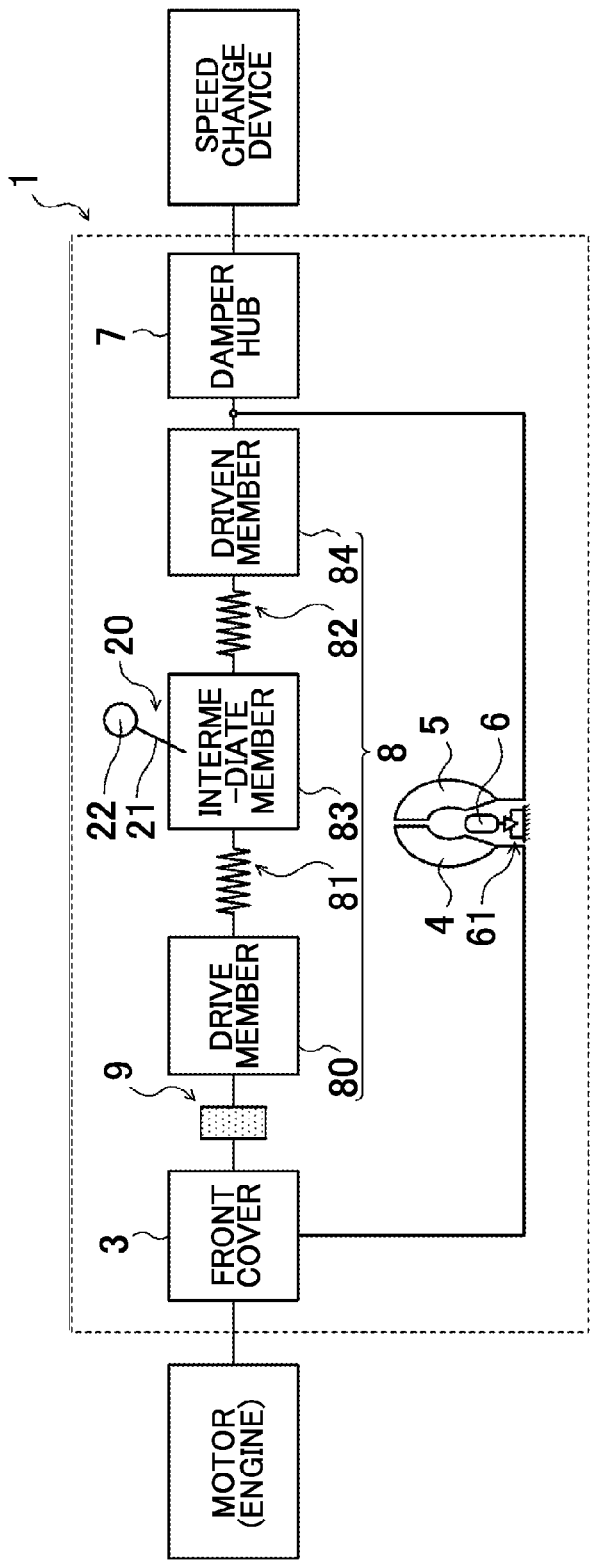

F I G . 4
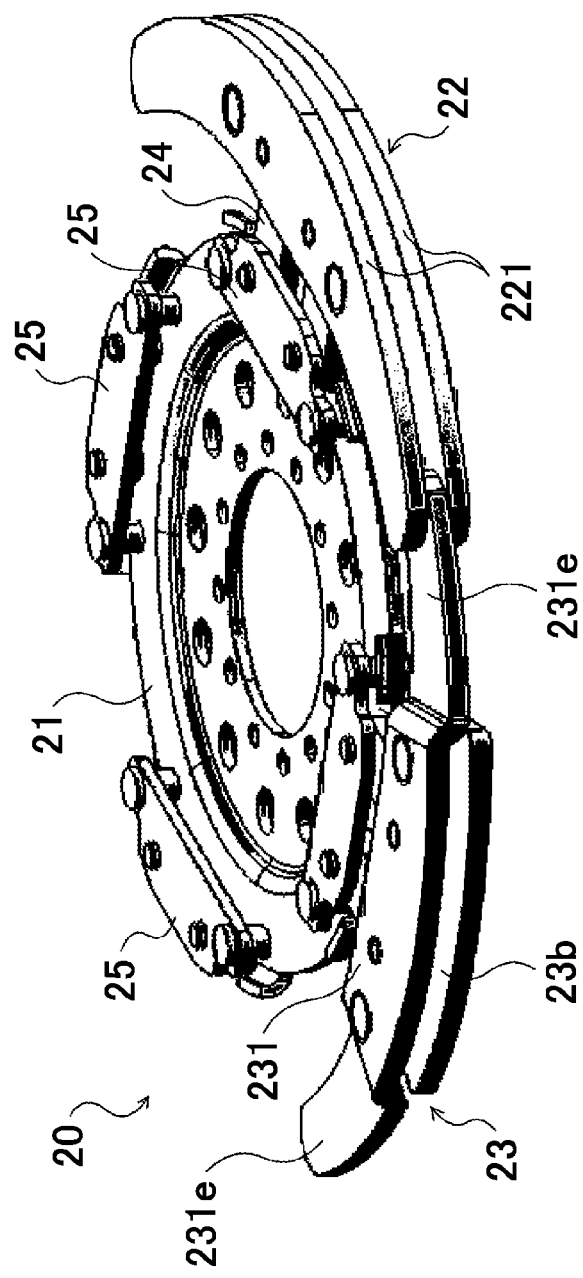

CENTRIFUGAL-PENDULUM VIBRATION ABSORBING DEVICE

The disclosure of Japanese Patent Applications No. 2010-294401 filed on Dec. 29, 2010 and No. 2010-294404 filed on Dec. 29, 2010 including the specification, drawings and abstract is incorporated herein by reference in its entirety.

BACKGROUND OF THE INVENTION

1. Field of the Invention

The present invention relates to a centrifugal-pendulum vibration absorbing device including a support member attached coaxially with a rotary element and a plurality of mass bodies swingably coupled to the support member and disposed adjacent to each other in the circumferential direction.

2. Description of the Related Art

Hitherto, there has been known a centrifugal-pendulum vibration absorbing device including a support member attached coaxially with a turbine runner of a fluid transmission device and a plurality of pendulum masses (mass bodies) each coupled to the support member via a support roller so as to be swingable with respect to the support member (see German Patent Application Publication No. 102006028556, for example). In the centrifugal-pendulum vibration absorbing device, the plurality of pendulum masses swing in the same direction with respect to the support member along with rotation of the support member to damp vibration transferred to the support member. The pendulum masses of the centrifugal-pendulum vibration absorbing device are each formed by coupling weights disposed on the front side and the back side of the flange-like support member to each other using the support roller. There also has been known a centrifugal-pendulum vibration absorbing device including pendulum masses each formed by weights swingably coupled to a flange-like support member via a plurality of arm members (see International Patent Application Publication No. 2010/066665, for example).

SUMMARY OF THE INVENTION

The centrifugal-pendulum vibration absorbing devices discussed above can damp vibration transmitted to the support member more effectively as the weight of each mass body is larger. However, increasing the weight of each mass body of the centrifugal-pendulum vibration absorbing device basically inevitably increases the size of the mass bodies, and the increased size of the mass bodies reduces the clearance between mass bodies disposed adjacent to each other. Therefore, in the case where the size of the mass bodies is increased to secure the weight, mass bodies disposed adjacent to each other may come so close to each other that respective end portions of the mass bodies collide against each other to cause occurrence of an abnormal sound when the rotational speed of the support member is relatively low and the behavior of the mass bodies tends to be unstable, for example.

It is therefore a main object of the present invention to provide a centrifugal-pendulum vibration absorbing device that can secure the weight of mass bodies while suppressing a collision between mass bodies disposed adjacent to each other and occurrence of an abnormal sound due to such a collision.

In order to achieve the foregoing main object, the centrifugal-pendulum vibration absorbing device according to the present invention adopts the following means.

According to a first aspect of the present invention, a centrifugal-pendulum vibration absorbing device includes a support member attached coaxially with a rotary element, and a plurality of mass bodies swingably coupled to the support member and disposed adjacent to each other in a circumferential direction. In the centrifugal-pendulum vibration absorbing device, the plurality of mass bodies are configured such that when a first mass body, which is one of two mass bodies disposed adjacent to each other, and a second mass body, which is the other of the two mass bodies, move with respect to the support member so as to approach each other, the first mass body and the second mass body overlap each other as seen from an axial direction of the rotary element.

The plurality of mass bodies of the centrifugal-pendulum vibration absorbing device are configured such that when the first mass body, which is one of two mass bodies disposed adjacent to each other, and the second mass body, which is the other of the two mass bodies, move with respect to the support member so as to approach each other, the first mass body and the second mass body overlap each other as seen from the axial direction of the rotary element. This makes it less likely that the behavior of the mass bodies becomes unstable and that the mass bodies disposed adjacent to each other collide against each other when the mass bodies approach each other even if the clearance between the mass bodies disposed adjacent to each other is reduced because of an increase in size of the mass bodies in order to secure the weight of the mass bodies. Thus, the centrifugal-pendulum vibration absorbing device can secure the weight of mass bodies while suppressing a collision between mass bodies disposed adjacent to each other and occurrence of an abnormal sound due to such a collision.

According to a second aspect of the present invention, a recessed portion may be formed at an end portion of the first mass body on a side of the second mass body, the recessed portion opening at least on an outer circumferential side, an inner circumferential side, and the side of the second mass body as seen from a radial direction, and an end portion of the second mass body on a side of the first mass body may be formed so as to be loosely fitted in the recessed portion of the first mass body. This allows the end portion of the first mass body on the second mass body side and the end portion of the second mass body on the first mass body side to overlap each other as seen from the axial direction when the first mass body and the second mass body move with respect to the support member so as to approach each other.

According to a third aspect of the present invention, the first mass body may include a weight in which a gap is formed at least an end portion of the weight on the side of the second mass body, and an end portion of the second mass body on the side of the first mass body may be loosely fitted in the gap of the first mass body when the first mass body and the second mass body move with respect to the support member so as to approach each other. This makes it less likely that the behavior of the mass bodies becomes unstable and that the mass bodies disposed adjacent to each other collide against each other when the mass bodies approach each other even if the clearance between the mass bodies disposed adjacent to each other is reduced. Thus, the size of the mass bodies can be increased in the circumferential direction in order to secure the weight of the mass bodies, and an increase in axial length and outside diameter of the centrifugal-pendulum vibration absorbing device can be suppressed. As a result, a compact centrifugal-pendulum vibration absorbing device that can secure the weight of the mass bodies while suppressing a collision between mass bodies disposed adjacent to each other and occurrence of an abnormal sound due to such a collision can be achieved.

According to a fourth aspect of the present invention, the first mass body may include two weights coupled to each other in the axial direction such that a gap is formed at least an end portion of the first mass body on the side of the second mass body. This facilitates forming the first mass body with a gap provided at its end portion on the second mass body side.

According to a fifth aspect of the present invention, the second mass body may be formed by two weights coupled to each other in the axial direction, and an end portion of one of the two weights on the side of the first mass body may be loosely fitted in the gap of the first mass body.

According to a sixth aspect of the present invention, the weight may be swingably coupled to the support member via an arm member. In addition, according to a seventh aspect of the present invention, a stopper portion that abuts against the arm member to prescribe a swing range of each of the mass bodies may be formed on the support member. Consequently, the stopper portion can be provided in a vacant space around the arm member without increasing the number of components.

According to an eighth aspect of the present invention, all of the plurality of mass bodies may have the same weight as each other, and the first mass body and the second mass body may have different structures from each other. In this case, every other mass body disposed on the support member has the same structure, and each mass body may be basically structured to be symmetric in the left-right direction. This allows each mass body to be well-balanced, which makes it possible to improve the vibration absorbing performance of the centrifugal-pendulum vibration absorbing device.

According to a ninth aspect of the present invention, all of the plurality of mass bodies may have the same structure and weight as each other. Providing all of the plurality of mass bodies with the same structure and weight as each other can reduce the number of types of components in the centrifugal-pendulum vibration absorbing device to reduce the cost of the centrifugal-pendulum vibration absorbing device.

According to a tenth aspect of the present invention, an end portion of the first mass body on the side of the second mass body and an end portion of the second mass body on the side of the first mass body may overlap each other at all times as seen from the axial direction. Causing the end portion of the first mass body on the second mass body side and the end portion of the second mass body on the first mass body side to overlap each other at all times as seen from the axial direction reliably makes it less likely that the first mass body and the second mass body collide against each other, and further expands the mass bodies in the circumferential direction to further increase the weight of the mass bodies.

According to an eleventh aspect of the present invention, the support member may be connected to a rotary element of a damper mechanism disposed between an input member coupled to a motor and an input shaft of a speed change device. This enables the centrifugal-pendulum vibration absorbing device to damp vibration between the input member and the input shaft of the speed change device so that transfer of such vibration to the speed change device is suppressed favorably.

BRIEF DESCRIPTION OF THE DRAWINGS

FIG. 1 shows a schematic configuration of a fluid transmission device 1 including a centrifugal-pendulum vibration absorbing device 20 according to an embodiment of the present invention;

FIG. 4 is a perspective view showing an essential portion of the centrifugal-pendulum vibration absorbing device 20;

DETAILED DESCRIPTION OF THE PREFERRED EMBODIMENT

Figure 2:
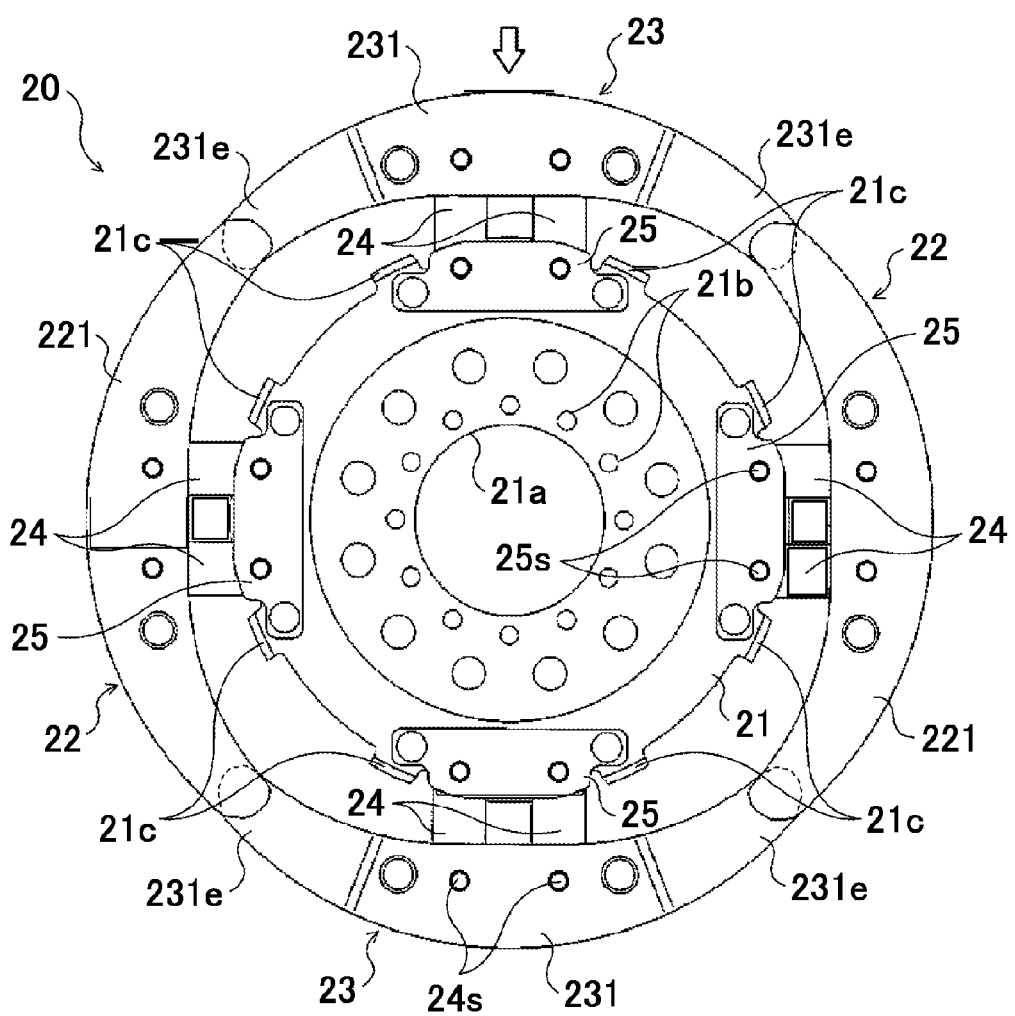
FIG. 2 is a front view of the centrifugal-pendulum vibration absorbing device 20.

Now, an embodiment of the present invention will be described.

FIG. 1 shows a schematic configuration of a fluid transmission device 1 including a centrifugal-pendulum vibration absorbing device 20 according to an embodiment of the present invention. The fluid transmission device 1 shown in FIG. 1 is a torque converter mounted as a starting device on a vehicle including an engine (internal combustion engine) serving as a motor, and includes a front cover (input member) 3 coupled to a crankshaft (not shown) of the engine, a pump impeller (input-side fluid transmission element) 4 fixed to the front cover 3, a turbine runner (output-side fluid transmission element) 5 disposed coaxially with the pump impeller 4 so as to be rotatable, a stator 6 that rectifies a flow of working oil (working fluid) from the turbine runner 5 to the pump impeller 4, a damper hub (output member) 7 fixed to an input shaft of a speed change device which is an automatic transmission (AT) or a continuously variable transmission (CVT) (not shown), a damper mechanism 8 connected to the damper hub 7, and a single-plate friction lock-up clutch mechanism 9 including a lock-up piston (not shown) connected to the damper mechanism 8, for example.

The pump impeller 4 and the turbine runner 5 face each other. The stator 6 is disposed between and coaxially with the pump impeller 4 and the turbine runner 5 so as to be rotatable. The rotational direction of the stator 6 is set to only one direction by a one-way clutch 61. The pump impeller 4, the turbine runner 5, and the stator 6 form a torus (annular flow passage) that allows circulation of working oil. While the fluid transmission device 1 is formed as a torque converter including the pump impeller 4, the turbine runner 5, and the stator 6, the fluid transmission device 1 may also be formed as a fluid coupling including no stator.

The damper mechanism 8 includes a drive member 80 serving as an input element fixed to the lock-up piston of the lock-up clutch mechanism 9, a plurality of first coil spring (first elastic bodies) 81, an intermediate member (intermediate element) 83 engaged with the drive member 80 via the first coil spring 81, a plurality of second coil spring (second elastic bodies) 82 having rigidity (spring constant) that is higher than that of the first coil spring 81 and disposed apart from the first coil spring 81 in the radial direction of the fluid transmission device 1, and a driven member (output element) 84 engaged with the intermediate member 83 via the second coil spring 82 and fixed to the damper hub 7. The lock-up clutch mechanism 9 operates on a hydraulic pressure from a hydraulic pressure control unit (not shown). The lock-up clutch mechanism 9 establishes and releases lock-up in which the front cover 3 and the damper hub 7 are coupled to each other via the damper mechanism 8. The fluid transmission device 1 may include a multi-plate friction lock-up clutch mechanism in place of the single-plate friction lock-up clutch mechanism 9.

In the fluid transmission device 1 discussed above, lock-up is established when the rotational speed of the engine coupled to the front cover 3 reaches a lock-up rotational speed Nlup that is extremely low, for example about 1000 rpm, in order to improve the efficiency of power transfer between the engine and the speed change device to further improve the fuel efficiency of the engine. In the fluid transmission device 1 according to the embodiment, the centrifugal-pendulum vibration absorbing device 20 is connected to the intermediate member 83 of the damper mechanism 8 in order to more favorably damp vibration between the front cover 3 and the damper hub 7 after lock-up is established to suppress transfer of such vibration to the input shaft of the speed change device at a later stage.

Figure 3:
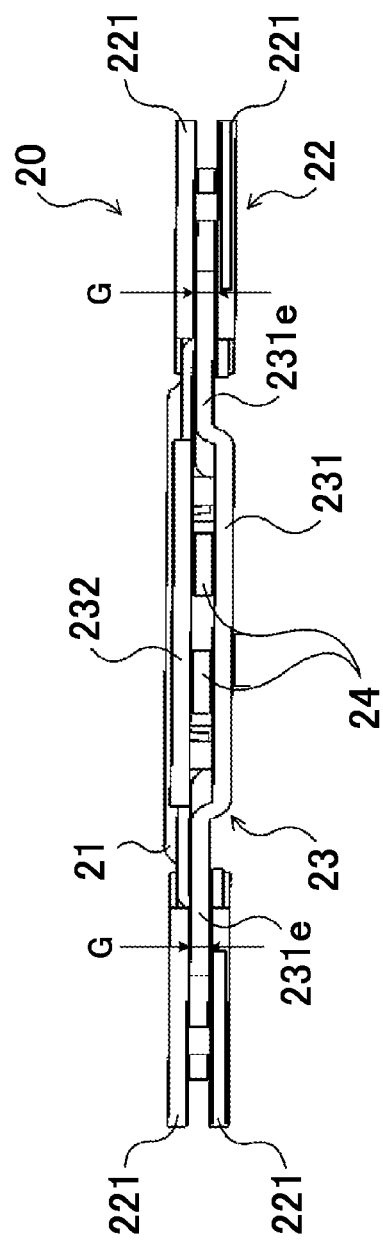
FIG. 3 illustrates the centrifugal-pendulum vibration absorbing device 20 as seen from a radial direction.
Figure 5:
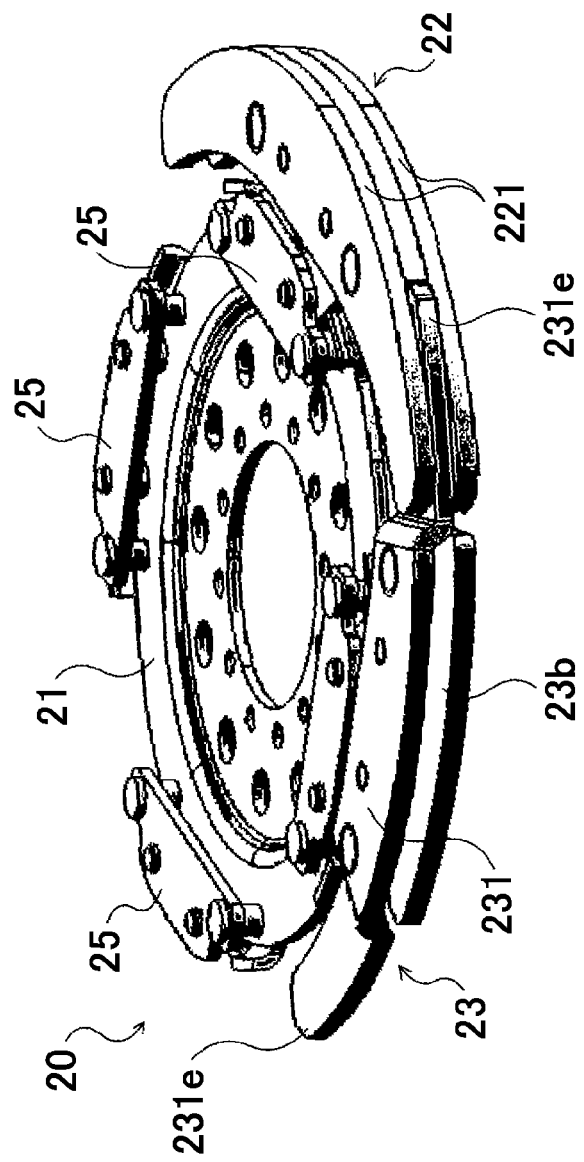
FIG. 5 is a perspective view showing an essential portion of the centrifugal-pendulum vibration absorbing device 20.

FIG. 2 is a front view of the centrifugal-pendulum vibration absorbing device 20. FIG. 3 illustrates the centrifugal-pendulum vibration absorbing device 20 as seen from a radial direction. FIG. 4 is a perspective view showing an essential portion of the centrifugal-pendulum vibration absorbing device 20. As shown in the drawings, the centrifugal-pendulum vibration absorbing device 20 includes a support member 21 fixed coaxially with respect to the intermediate member 83 which is a rotary element of the damper mechanism 8, and a plurality of (in the embodiment, two each) first mass bodies 22 and second mass bodies 23 swingably coupled to the support member 21 and disposed adjacent to each other in the circumferential direction.

The support member 21 is formed in a generally annular shape by pressing a metal plate, for example. The support member 21 includes a fitting hole 21*a* which is formed at its center portion and to which the damper hub 7 is rotatably fitted, for example, and a plurality of coupling holes 21*b* formed around the fitting hole 21*a*. The support member 21 according to the embodiment is fixed to the intermediate member 83 of the damper mechanism 8 via fastening members such as rivets inserted through the plurality of coupling holes 21*b*. The support member 21 is thus allowed to be disposed coaxially with and rotate together with the intermediate member 83.

The first mass bodies 22 and the second mass bodies 23 have the same weight as each other, but have different structures from each other. In the embodiment, as shown in FIG. 2, the first mass bodies 22 are disposed on the support member 21 with the second mass bodies 23 disposed on both sides of each of the first mass bodies 22. That is, in the embodiment, the first mass bodies 22 and the second mass bodies 23 are disposed alternately and at equal intervals (at every 90°). The two first mass bodies 22 are disposed symmetrically with respect to the center axis of the support member 21. The two second mass bodies 23 are disposed symmetrically with respect to the center axis of the support member 21.

As shown in FIGS. 2 and 3, each of the first mass bodies 22 is formed by two identical metal plates (weights) 221 curved generally in an arcuate shape so as to extend along the outer circumference of the support member 21 as seen from the axial direction of the support member 21, and structured to be symmetric in the left-right direction. The two metal plates 221 face each other in the axial direction of the support member 21 via a gap, and are coupled to each other via rivets or the like such that a gap G (see FIG. 3), which is a recessed portion, is formed at both end portions of the first mass body 22 in the longitudinal direction. The gap G formed at both end portions of the first mass body 22 opens on the outer circumferential side and the inner circumferential side of the first mass body 22 and on the side of the next second mass body 23 when the first mass body 22 is seen from a radial direction (see the white arrow in FIG. 2).

First end portions of two arm members 24 extending with a predefined gap therebetween are inserted between the two metal plates 221. The two arm members 24 are rotatably coupled with respect to the two metal plates 221 via respective support shafts (rollers) 24*s*. Further, second ends of the two arm members 24 are rotatably coupled to the support member 21 via respective support shafts (rollers) 25*s* such that the two arm members 24 extend in parallel with each other via the gap described above. In the embodiment, an arm support plate 25 is fixed with a gap in the axial direction with respect to the support member 21. The second ends of the two arm members 24 are inserted between the support member 21 and the arm support plate 25, and rotatably coupled to the support member 21 and the arm support plate 25 via the support shafts 25*s*. The support member 21 is formed with a plurality of stopper portions 21*c* positioned on both sides of the two arm members 24. Each stopper portion 21*c* abuts against a corresponding one of the arm members 24 to prescribe the swing range of the first mass body 22 coupled to the arm member 24. This enables the first mass body 22 to swing with respect to the support member 21 within the swing range prescribed by the stopper portions 21*c*.

As shown in FIGS. 2 and 3, each of the second mass bodies 23 is formed by a first metal plate (weight) 231 curved generally in an arcuate shape so as to extend along the outer circumference of the support member 21 as seen from the axial direction of the support member 21, and a second metal plate (weight) 232 having a circumferential length that is shorter than that of the first metal plate 231, and structured to be symmetric in the left-right direction as with the first mass body 22. The first metal plate 231 has a planar shape that is generally identical to that of the metal plates 221 forming the first mass body 22. As shown in FIGS. 3 and 4, both end portions 231*e* of the first metal plate 231 are formed to be offset with respect to the center portion of the first metal plate 231 by pressing or the like. The second metal plate 232 is formed to have a planar shape that is generally identical to that of the center portion of the first metal plate 231, and coupled via rivets or the like to face the center portion of the first metal plate 231 in the axial direction of the support member 21. The thickness of both end portions 231*e* of the first metal plate 231 is defined to be slightly smaller than the width (width in the axial direction) of the gap G formed at both end portions of the first mass body 22.

First end portions of two arm members 24 extending with a predefined gap therebetween are inserted between the first metal plate 231 and the second metal plate 232. The two arm members 24 are rotatably coupled with respect to the first metal plate 231 and the second metal plate 232 via respective support shafts (rollers) 24s. Further, second ends of the two arm members 24 are rotatably coupled to the support member 21 and an arm support plate 25 via respective support shafts (rollers) 25s such that the two arm members 24 extend in parallel with each other via the gap described above. The support member 21 is formed with a plurality of stopper portions 21c positioned on both sides of the two arm members 24. Each stopper portion 21c abuts against a corresponding one of the arm members 24 to prescribe the swing range of the second mass body 23 coupled to the arm member 24. This enables the second mass body 23 to swing with respect to the support member 21 within the swing range prescribed by the stopper portions 21c.

In the embodiment, as shown in FIGS. 2 to 4, both end portions of the second mass body 23, that is, both end portions 231e of the first metal plate 231, are loosely fitted in the gap G formed at a corresponding end portion of the first mass body 22 positioned on both sides. That is, an end portion of the first mass body 22 on the second mass body 23 side and an end portion of the second mass body 23 on the first mass body 22 side overlap each other as seen from the axial direction of the support member 21. In the embodiment, the dimensions of the metal plates 221, the first metal plates 231, and the second metal plates 232, the position of the rivets, and so forth are determined such that respective end portions of the first mass body 22 and the second mass body 23 disposed adjacent to each other overlap each other at all times as seen from the axial direction of the support member 21, and such that surfaces of the end portions of the first mass body 22 and the second mass body 23 do not contact other members such as the rivets, no matter how the first mass body 22 and the second mass body 23 move within the swing range with respect to the support member 21.

Next, an operation of the centrifugal-pendulum vibration absorbing device 20 configured as described above will be described.

As seen from FIG. 1, when lock-up is established by the lock-up clutch mechanism 9 of the fluid transmission device 1, power from the engine serving as a motor is transferred to the input shaft of the speed change device via the front cover 3, the lock-up clutch mechanism 9, the drive member 80, the first coil spring 81, the intermediate member 83, the second coil spring 82, the driven member 84, and the damper hub 7. In this event, variations in torque input to the front cover 3 are mainly absorbed by the first and second coil springs 81 and 82 of the damper mechanism 8. In the fluid transmission device 1 according to the embodiment, further, when the damper mechanism 8 coupled to the front cover 3 is rotated together with the front cover 3 by the lock-up piston along with the lock-up, the support member 21 coupled to the intermediate member 83 of the damper mechanism 8 also rotates together with the intermediate member 83 about the axis of the fluid transmission device 1. Thus, the first mass bodies 22 and the second mass bodies 23 forming the centrifugal-pendulum vibration absorbing device 20 swing in the same direction with respect to the support member 21 along with the rotation of the support member 21. Consequently, vibration that is opposite in phase to vibration (resonance) of the intermediate member 83 is applied from the centrifugal-pendulum vibration absorbing device 20 to the intermediate member 83, which enables the centrifugal-pendulum vibration absorbing device 20 to absorb (damp) vibration between the front cover 3 and the damper hub 7.

In the centrifugal-pendulum vibration absorbing device 20 configured as discussed above, each of the first mass bodies 22 and the second mass bodies 23 is independently swingable with respect to the support member 21. Thus, the behavior of the first mass bodies 22 and the second mass bodies 23 tends to be unstable so that the first mass body 22 and the second mass body 23 which are disposed adjacent to each other may move in opposite directions to approach each other when the rotational speed of the engine (support member 21) is relatively low, for example. In the case where the first mass body 22 and the second mass body 23 which are disposed adjacent to each other approach each other, respective end portions of the first mass body 22 and the second mass body 23 which are disposed adjacent to each other may collide against each other to cause occurrence of an abnormal sound if no measures are taken.

In the centrifugal-pendulum vibration absorbing device 20 according to the embodiment, as a measure, end portions of the second mass body 23, that is, the end portions 231e of the first metal plate 231, are loosely fitted at all times in the gap G formed at a corresponding end portion of the first mass body 22 positioned adjacent to the second mass body 23. Thus, the end portions 231e of the first metal plate 231 forming the second mass body 23 can be received further deeper in the gap G formed at an end portion of the first mass body 22 even if the first mass body 22 and the second mass body 23 move so as to approach each other. Thus, respective end portions of the first mass body 22 and the second mass body 23 disposed adjacent to each other do not collide against each other, which can favorably suppress occurrence of an abnormal sound.

As described above, the first mass body 22 and the second mass body 23, which are disposed adjacent to each other, of the centrifugal-pendulum vibration absorbing device 20 according to the embodiment are configured such that an end portion of the first mass body 22 on the second mass body 23 side and an end portion of the second mass body 23 on the first mass body 22 side overlap each other as seen from the axial direction of the support member 21 (the intermediate member 83 which is a rotary element) when the first mass body 22 and the second mass body 23 move with respect to the support member 21 so as to approach each other. This makes it less likely that the behavior of the first mass bodies 22 and the second mass bodies 23 becomes unstable and that the first mass body 22 and the second mass body 23 which are disposed adjacent to each other collide against each other when the first mass body 22 and the second mass body 23 approach each other even if the size of the first mass bodies 22 and the second mass bodies 23 is increased in the circumferential direction, in particular, in order to secure the weight of the first mass bodies 22 and the second mass bodies 23. Thus, in the centrifugal-pendulum vibration absorbing device 20 according to the embodiment, the weight of the first mass bodies 22 and the second mass bodies 23 can be secured while suppressing a collision between the first mass body 22 and the second mass body 23 which are disposed adjacent to each other and occurrence of an abnormal sound due to such a collision. The first mass body 22 and the second mass body 23 may be configured such that an end portion of one of the mass bodies and a portion other than an end portion of the other overlap each other as seen from the axial direction, or such that respective portions of both the mass bodies other than end portions overlap each other as seen from the axial direction, when the first mass body 22 and the second mass body 23 move with respect to the support member 21 so as to approach each other.

In addition, in the case where the centrifugal-pendulum vibration absorbing device is connected to the engine via the front cover or the like as in the embodiment described above, it is necessary to increase the deflection angle (swing range) of the first mass bodies 22 and the second mass bodies 23 as the number of cylinders of the engine is reduced (smaller), which makes the first mass bodies 22 and the second mass bodies 23 more likely to collide against each other. According to the centrifugal-pendulum vibration absorbing device 20 of the embodiment described above, however, a collision between the first mass bodies 22 and the second mass bodies 23 can be suppressed favorably even if the deflection angle (swing range) of the first mass bodies 22 and the second mass bodies 23 is increased. Thus, the centrifugal-pendulum vibration absorbing device 20 according to the embodiment is extremely suitable to damp vibration between the engine with a reduced number of cylinders and the speed change device.

Furthermore, connecting the support member 21 of the centrifugal-pendulum vibration absorbing device 20 to the intermediate member 83, which is a rotary element of the damper mechanism 8 disposed between the front cover 3 coupled to the engine and the damper hub 7 connected to the input shaft of the speed change device, enables the centrifugal-pendulum vibration absorbing device 20 to damp vibration between the front cover 3 and the damper hub 7 so that transfer of such vibration to the speed change device is suppressed favorably. The support member 21 of the centrifugal-pendulum vibration absorbing device 20 may be connected to the drive member (input member) 80, which is a rotary element of the damper mechanism 8, or may be connected to the driven member (output member) 84, which is a rotary element of the damper mechanism 8.

In the embodiment described above, moreover, the gap G, which is a recessed portion that opens on the outer circumferential side and the inner circumferential side and on the side of the second mass body 23 as seen from a radial direction, is formed at an end portion (both end portions) of the first mass body 22 on the second mass body 23 side, and each end portion of the second mass body 23 on the first mass body 22 side is formed so as to be loosely fitted in the gap G of the first mass body 22. This allows the end portion of the first mass body 22 on the second mass body 23 side and the end portion of the second mass body 23 on the first mass body 22 side to overlap each other as seen from the axial direction when the first mass body 22 and the second mass body 23 move with respect to the support member 21 so as to approach each other.

In the embodiment described above, further, the first mass body 22 is formed by the two metal plates (weights) 221 coupled in the axial direction such that the gap G is formed at both end portions in the longitudinal direction, that is, an end portion on the second mass body 23 side, and the second mass body 23 is formed by the two metal plates coupled in the axial direction, namely the first metal plate (weight) 231 and the second metal plate (weight) 232. That is, the first mass body 22 is formed by the two metal plates 221 facing and coupled to each other in the axial direction of the support member 21 via the arm members 24, and the two metal plates 221 form the gap G at an end portion of the first mass body 22 on the second mass body 23 side, that is, at both end portions of the first mass body 22. By forming the first mass body 22 using the two metal plates 221 coupled to each other in the axial direction, the gap G, which is a recessed portion that opens on the outer circumferential side and the inner circumferential side and on the side of the second mass body 23 as seen from a radial direction, can be easily formed at an end portion of the first mass body 22 on the second mass body 23 side.

Figure 6A:
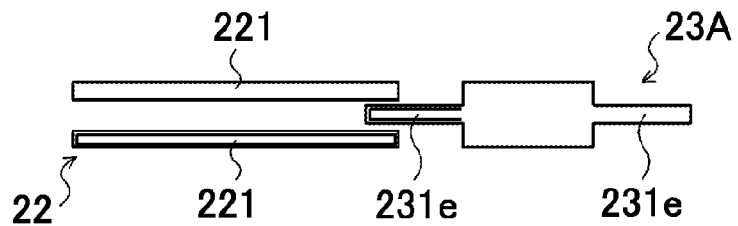
FIG. 6A is a schematic diagram showing a second mass body 23A according to a modification example.
Figure 6B:
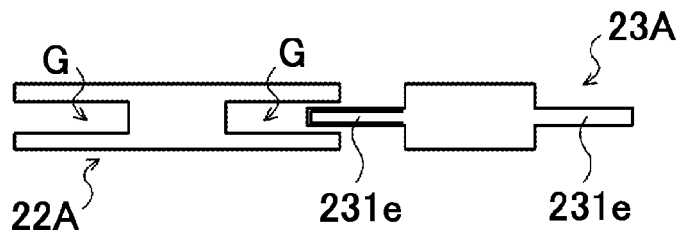
FIG. 6B is a schematic diagram showing a first mass body 22A according to the modification example.

In addition, the second mass body 23 is formed by the first metal plate 231 and the second metal plate 232 facing and coupled to each other in the axial direction of the support member 21 via the arm members 24. Each end portion of the second mass body 23 on the first mass body 22 side, that is, the end portion 231e of the first metal plate 231, is loosely fitted in the gap G of the first mass body 22 when the first mass body 22 and the second mass body 23 move with respect to the support member 21 so as to approach each other. This makes it less likely that the behavior of the first mass bodies 22 and the second mass bodies 23 becomes unstable and that the first mass body 22 and the second mass body 23 which are disposed adjacent to each other collide against each other when the first mass body 22 and the second mass body 23 approach each other. Thus, the size of the first mass bodies 22 and the second mass bodies 23 can be increased in the circumferential direction in order to secure the weight of the first mass bodies 22 and the second mass bodies 23, and an increase in axial length and outside diameter of the centrifugal-pendulum vibration absorbing device 20 can be suppressed. As a result, it is possible to secure the weight of the first mass bodies 22 and the second mass bodies 23 and to make the centrifugal-pendulum vibration absorbing device 20 compact while suppressing a collision between the first mass body 22 and the second mass body 23 which are disposed adjacent to each other and occurrence of an abnormal sound due to such a collision. The centrifugal-pendulum vibration absorbing device 20 may include second mass bodies 23A, in each of which both end portions 231e, attachment portions of the arm members 24, and so forth are formed integrally as shown in FIG. 6A, in place of the second mass bodies 23 discussed above. The centrifugal-pendulum vibration absorbing device 20 may also include first mass bodies 22A, each of which is formed as a single member with the gap G provided at both end portions as shown in FIG. 6B, along with the second mass bodies 23 or 23A.

Furthermore, by forming the stopper portion 21c, which abuts against a corresponding one of the arm members 24 to prescribe the swing range of the first mass body 22 or the second mass body 23, in the support member 21 as in the embodiment described above, the stopper portion 21c can be provided in a vacant space around the arm member 24 without increasing the number of components.

In the embodiment described above, moreover, all of the plurality of first mass bodies 22 and second mass bodies 23 have the same weight as each other, the first mass bodies 22 and the second mass bodies 23 have different structures from each other, and the first mass bodies 22 are disposed on the support member 21 with the second mass bodies 23 disposed on both sides of each of the first mass bodies 22. This enables the first mass bodies 22 and the second mass bodies 23 to be well-balanced with a structure that is symmetric in the left-right direction, which improves the vibration absorbing performance of the centrifugal-pendulum vibration absorbing device 20.

In the embodiment described above, an end portion of the first mass body 22 on the second mass body 23 side and an end portion of the second mass body 23 on the first mass body 22 side overlap each other at all times as seen from the axial direction. This reliably makes it less likely that the first mass bodies 22 and the second mass bodies 23 collide against each other, and further expands the first mass bodies 22 and the second mass bodies 23 in the circumferential direction to further increase the weight of the first mass bodies 22 and the second mass bodies 23.

Figure 7:
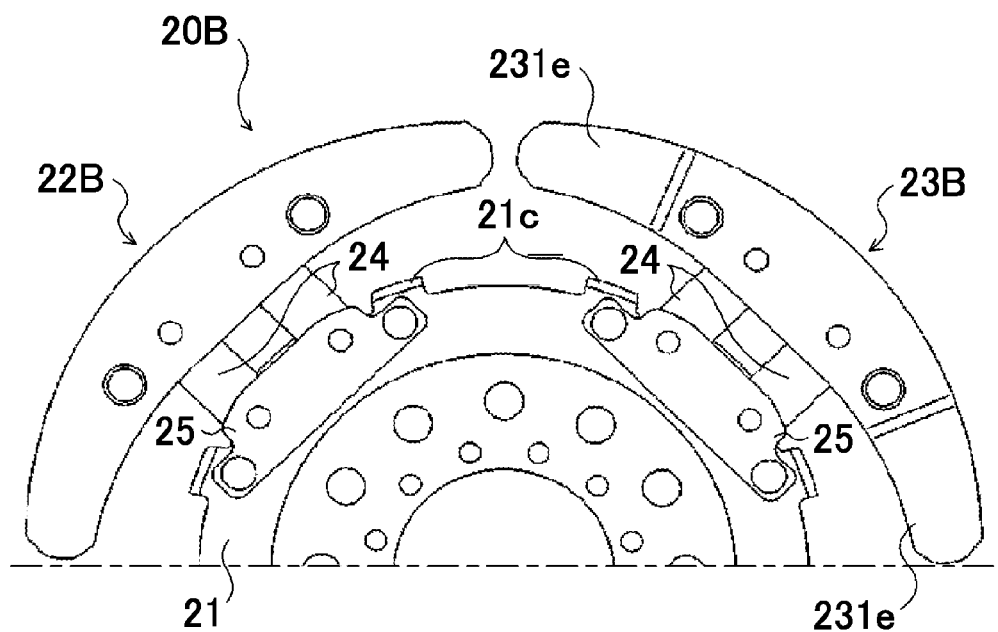
FIG. 7 shows a schematic configuration of a centrifugal-pendulum vibration absorbing device 20B according to a modification example.
Figure 8:
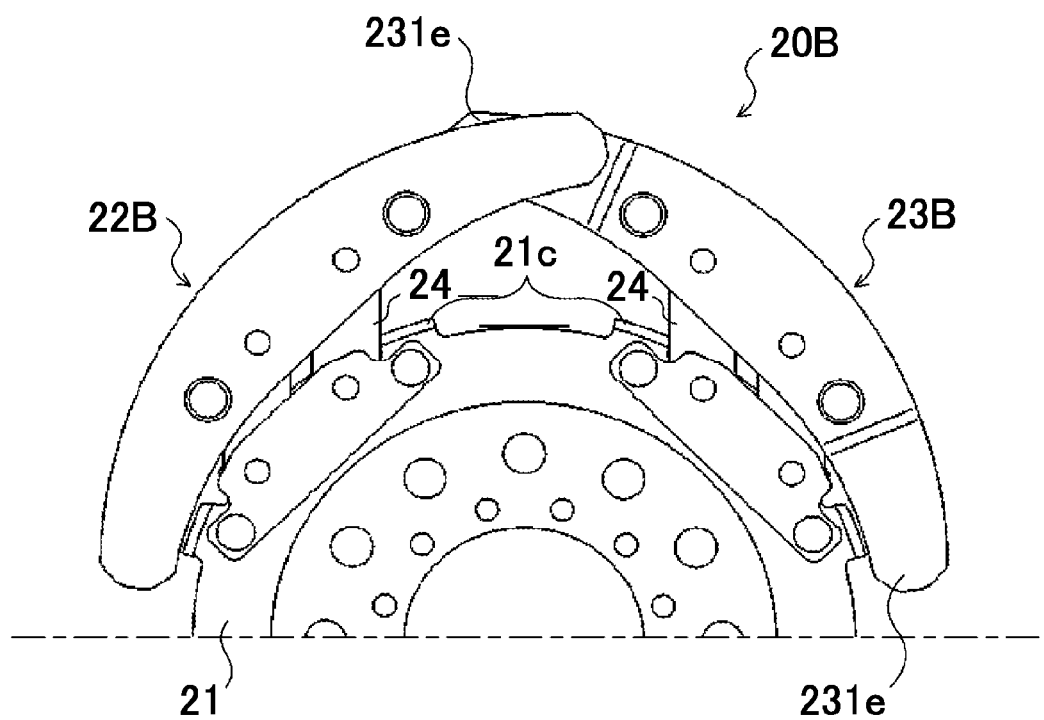
FIG. 8 is a schematic configuration diagram illustrating an operation of the centrifugal-pendulum vibration absorbing device 20B.

FIG. 7 shows a schematic configuration of a centrifugal-pendulum vibration absorbing device 20B according to a modification example. Hereinafter, elements that are identical to those described in relation to the centrifugal-pendulum vibration absorbing device 20 described above are given the same reference numerals to omit redundant descriptions. First mass bodies 22B and second mass bodies 23B forming the centrifugal-pendulum vibration absorbing device 20B of FIG. 7 are configured such that respective end portions of the first mass body 22B and the second mass body 23B disposed adjacent to each other do not overlap each other as seen from the axial direction when the first mass body 22B and the second mass body 23B are in a neutral state (with the center line between the two arm members 24 passing through the center of the support member 21) or swing in the same direction as each other. The first mass body 22B and the second mass body 23B are configured such that an end portion of the first mass body 22B on the second mass body 23B side and an end portion of the second mass body 23B on the first mass body 22B side can overlap each other as seen from the axial direction of the support member 21 only when the first mass body 22 and the second mass body 23 move with respect to the support member 21 so as to approach each other within the swing range as shown in FIG. 8. Thus, in the centrifugal-pendulum vibration absorbing device according to the present invention, respective end portions of the plurality of mass bodies disposed adjacent to each other may not overlap each other at all times as seen from the axial direction.

Figure 9:
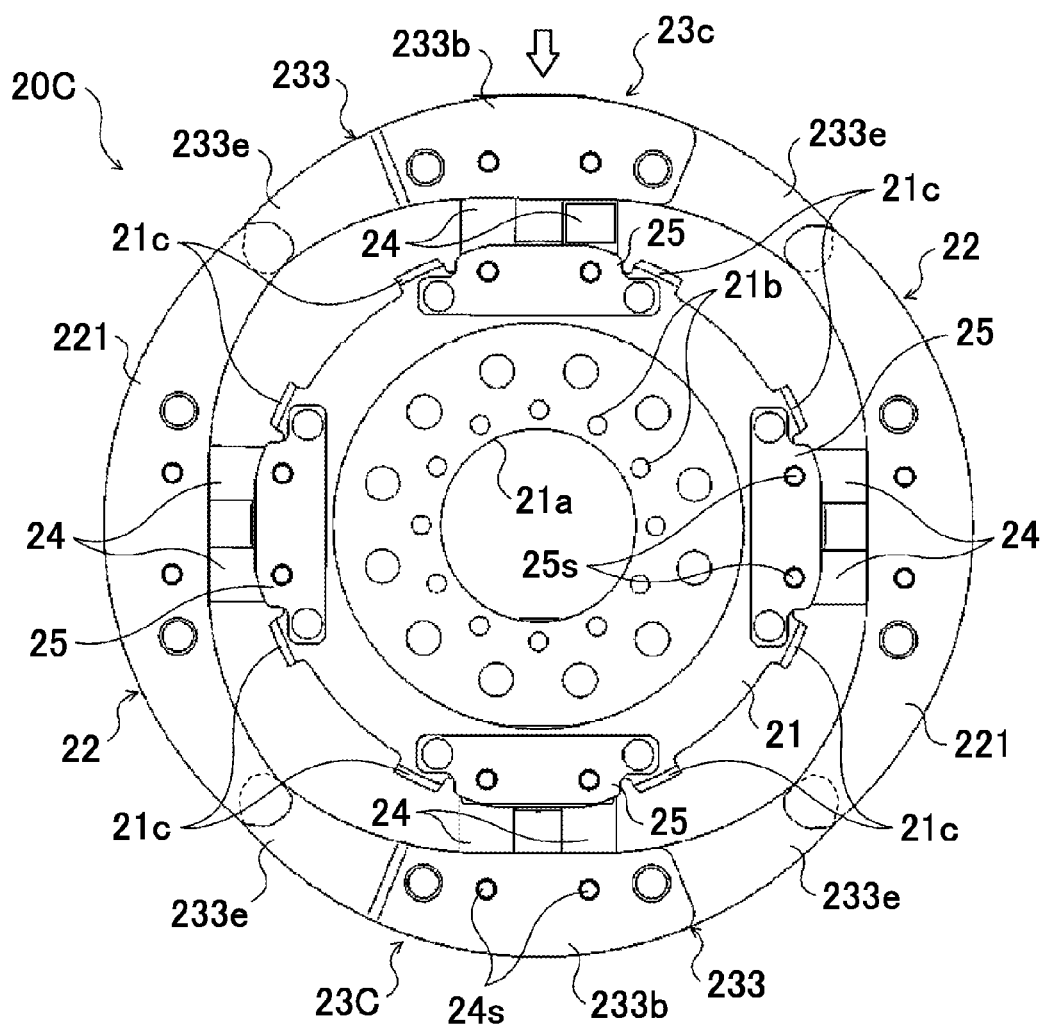
FIG. 9 is a front view of a centrifugal-pendulum vibration absorbing device 20C according to another modification example.
Figure 10:
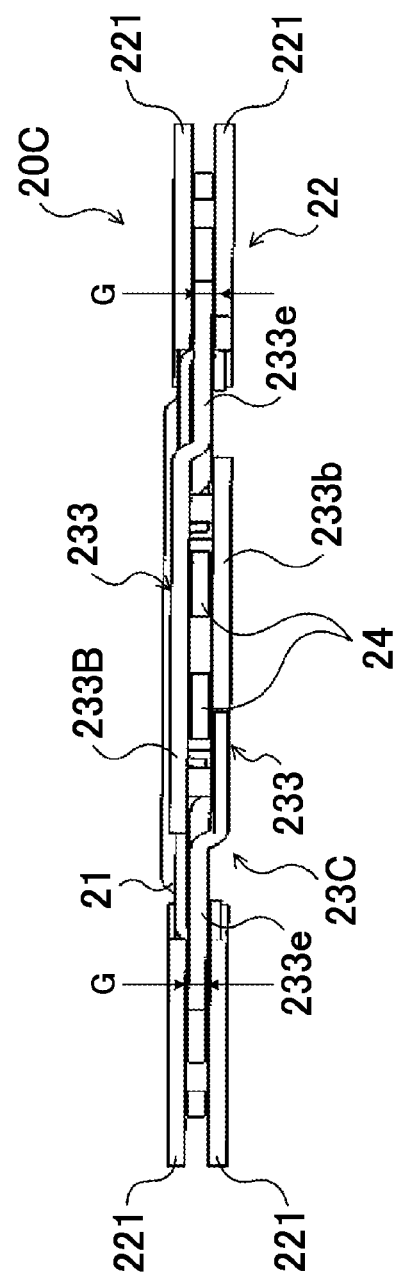
FIG. 10 illustrates the centrifugal-pendulum vibration absorbing device 20C as seen from a radial direction.

FIG. 9 is a front view of a centrifugal-pendulum vibration absorbing device 20C according to another modification example. FIG. 10 illustrates the centrifugal-pendulum vibration absorbing device 20C as seen from a radial direction. Each of second mass bodies 23C forming the centrifugal-pendulum vibration absorbing device 20C shown in the drawings is formed by two identical metal plates (weights) 233 curved generally in an arcuate shape so as to extend along the outer circumference of the support member 21. Each of the metal plates 233 includes a base portion 233b and an engagement end portion 233e extending from the base portion 233b. As shown in FIG. 10, the metal plate 233 is formed such that the engagement end portion 233e is offset with respect to the base portion 233b in the axial direction of the support member 21 as seen from a radial direction when the second mass body 23C is attached to the support member 21. The two metal plates 233 are coupled to each other via rivets or the like such that the respective base portions 233b face each other in the axial direction of the support member 21 and the respective engagement end portions 233e are positioned on opposite sides to each other. Further, first end portions of the two arm members 24 are inserted between the base portions 233b of the two metal plates 233. The two arm members 24 are rotatably coupled with respect to the two metal plates 233 via the respective support shafts 24s, and rotatably coupled to the support member 21 and the arm support plate 25 via the respective support shafts 25s. As shown in FIGS. 9 and 10, the engagement end portions 233e of the metal plates 231 are loosely fitted in the gap G formed at a corresponding end portion of the first mass body 22 positioned on both sides. The thus configured second mass bodies 23C are also well-balanced with a structure that is symmetric in the left-right direction. Providing the second mass bodies 23C each formed by the two identical metal plates 233 can reduce the number of types of components in the centrifugal-pendulum vibration absorbing device 20C to reduce the cost of the centrifugal-pendulum vibration absorbing device 20C.

Figure 11:
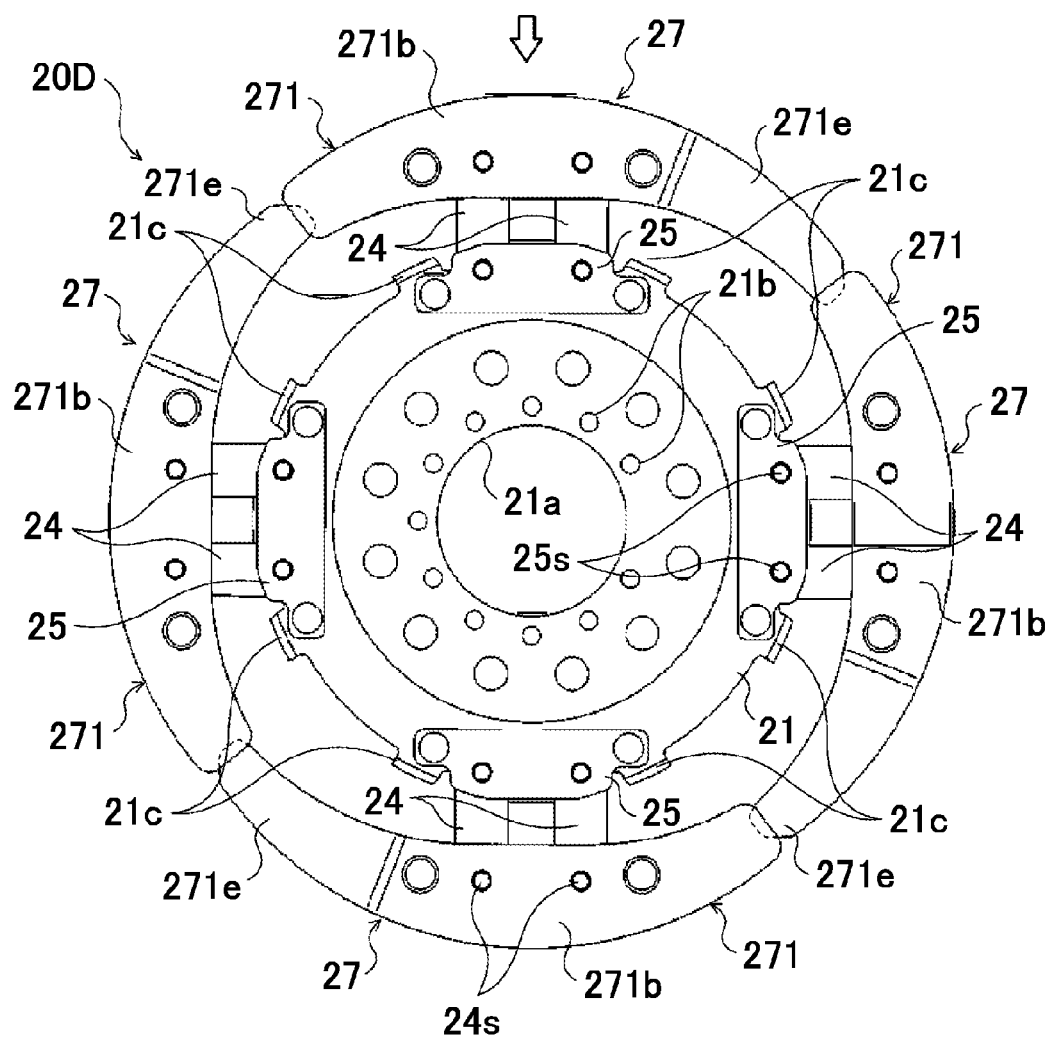
FIG. 11 is a front view of a centrifugal-pendulum vibration absorbing device 20D according to still another modification example.
Figure 12:
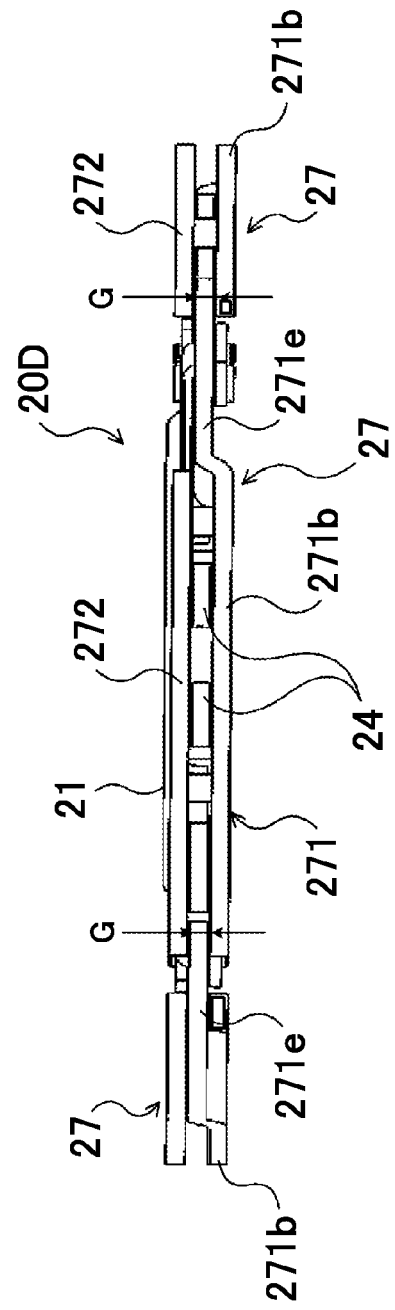
FIG. 12 illustrates the centrifugal-pendulum vibration absorbing device 20D as seen from a radial direction.

FIG. 11 is a front view of a centrifugal-pendulum vibration absorbing device 20D according to another modification example. FIG. 12 illustrates the centrifugal-pendulum vibration absorbing device 20D as seen from a radial direction. The centrifugal-pendulum vibration absorbing device 20D shown in the drawings includes a plurality of mass bodies 27 with the same structure and mass as each other. Each of the mass bodies 27 is formed by a first metal plate (weight) 271 curved generally in an arcuate shape so as to extend along the outer circumference of the support member 21 and a second metal plate (weight) 272 having a circumferential length that is shorter than that of the first metal plate 271. The first metal plate 271 includes a base portion 271b and an engagement end portion 271e extending from the base portion 271b. As shown in FIG. 12, the first metal plate 271 is formed such that the engagement end portion 271e is offset with respect to the base portion 271b in the axial direction of the support member 21 as seen from a radial direction when the mass body 27 is attached to the support member 21. The second metal plate 272 is formed to have a planar shape that is generally identical to that of the base portion 271b of the first metal plate 271.

The second metal plate 272 is coupled via rivets or the like to face the base portion 271b of the first metal plate 271 in the axial direction of the support member 21. The gap G is formed between the first metal plate 271 and the second metal plate 272 at an end portion opposite the engagement end portion 271e. Further, first end portions of the two arm members 24 are inserted between the base portion 271b of the first metal plate 271 and the second metal plate 272. The two arm members 24 are rotatably coupled with respect to the two metal plates 233 via the respective support shafts 24s, and rotatably coupled to the support member 21 and the arm support plate 25 via the respective support shafts 25s. As shown in FIGS. 11 and 12, the engagement end portion 271e of each mass body 27 is loosely fitted in the gap G formed at an end portion of an adjacent mass body 27. Providing all of the plurality of mass bodies 27 with the same structure and weight as each other can reduce the number of types of components in the centrifugal-pendulum vibration absorbing device 20D to reduce the cost of the centrifugal-pendulum vibration absorbing device 20D.

Figure 13A:
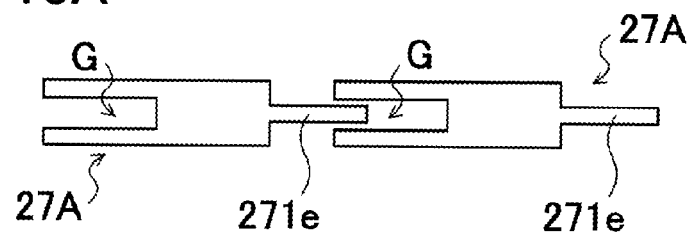
FIG. 13A is a schematic diagram showing a mass body 27A according to the modification example.
Figure 13B:
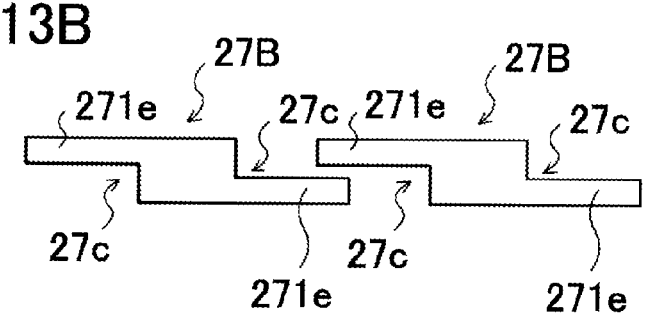
FIG. 13B is a schematic diagram showing a mass body 27B according to the modification example.

The centrifugal-pendulum vibration absorbing device 20D may include a plurality of mass bodies 27A, each of which is formed as a single member including the engagement end portion 271e at a first end side and the gap G at a second end side as shown in FIG. 13A, in place of the mass bodies 27 discussed above. Alternatively, the centrifugal-pendulum vibration absorbing device 20E may include a plurality of mass bodies 27B having the engagement end portion 271e at both ends as shown in FIG. 13B. The mass body 27B is formed such that the first engagement end portion 271e is offset with respect to the second engagement end portion 271e in the axial direction of the support member 21 as seen from a radial direction in the longitudinal direction when the mass body 27B is attached to the support member 21. A recessed portion 27c, which opens on the outer circumferential side, the inner circumferential side, on the side of an adjacent mass body 27B as seen from a radial direction, and on the first side or the second side in the axial direction of the support member 21 (in the drawing, up-down direction), is formed at a side (in the drawing, above or below) of each engagement end portion 271e. The engagement end portion 271e of an adjacent mass body 27B is loosely fitted in the recessed portion 27c. Such a mass body 27B may be formed as a single member or by a plurality of members.

Figure 14:
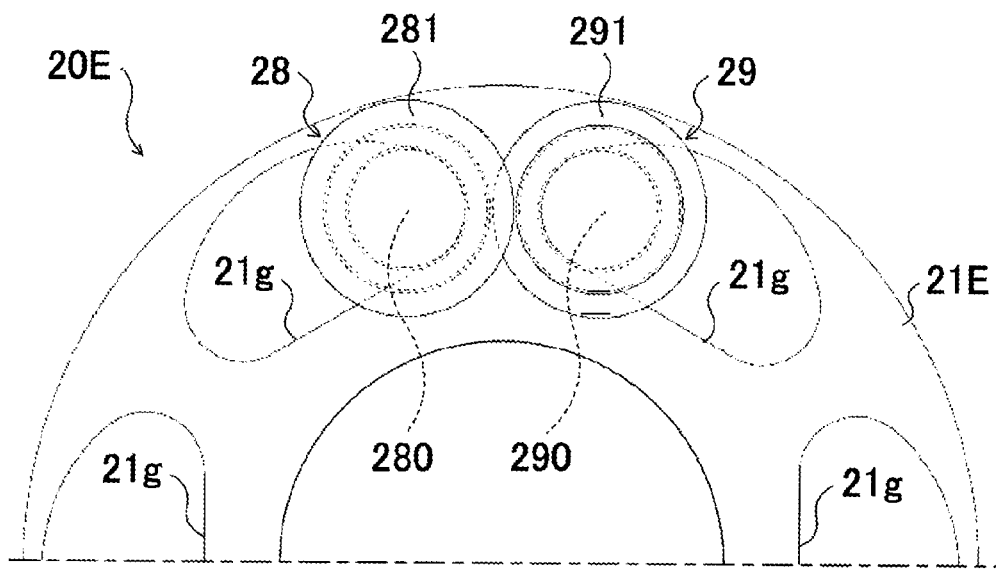
FIG. 14 is a front view of a centrifugal-pendulum vibration absorbing device 20E according to another modification example.
Figure 15:
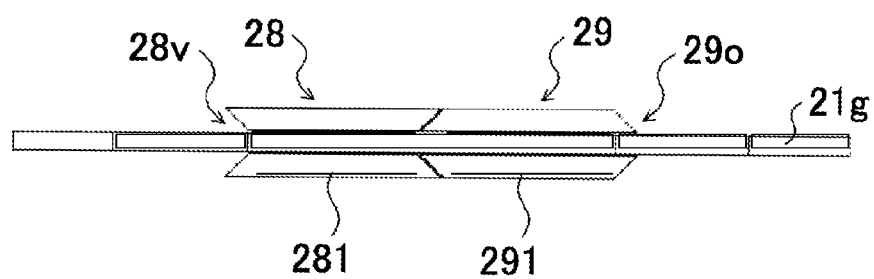
FIG. 15 illustrates the centrifugal-pendulum vibration absorbing device 20E as seen from a radial direction.

FIG. 14 is a front view of a centrifugal-pendulum vibration absorbing device 20E according to another modification example. FIG. 15 illustrates the centrifugal-pendulum vibration absorbing device 20E as seen from a radial direction. The centrifugal-pendulum vibration absorbing device 20E shown in the drawings includes an annular support member 21E having a plurality of guide holes 21g, and first mass bodies 28 and second mass bodies 29 that roll along the corresponding guide holes 21g so as to be swingable with respect to the support member 21E. The plurality of guide holes 21g are long holes of an identical shape with a curved inner circumferential edge, and are formed at equal intervals in the support member 21E. Each of the first mass bodies 28 includes a support shaft (roller) 280 inserted through the guide hole 21g of the support member 21 and disk-like metal plates (weights) 281 fixed to both ends of the support shaft 280. Likewise, each of the second mass bodies 29 includes a support shaft (roller) 290 inserted through the guide hole 21g of the support member 21 and disk-like metal plates (weights) 291 fixed to both ends of the support shaft 290. In the embodiment, the first mass bodies 28 are disposed for every other one of the plurality of guide holes 21g of the support member 21 with the second mass bodies 29 disposed on both sides of each of the first mass bodies 28.

As shown in FIG. 15, each of the metal plates 281 forming the first mass body 28 is formed in a short circular truncated cone. The two metal plates 281 are fixed to the support shaft 280 with their respective top surfaces (surfaces with the smaller area) facing each other. Consequently, a groove 28v with a generally V-shaped cross section is formed along the outer circumference of the first mass body 28. The groove functions as a recessed portion that opens on the outer circumferential side and the inner circumferential side and on the side of the next second mass body 29 when the first mass body 28 is seen from a radial direction. Each of the metal plates 291 forming the second mass body 29 is also formed in a short circular truncated cone. The two metal plates 291 are fixed to the support shaft 290 with their respective bottom surfaces (surfaces with the larger area) facing each other. Consequently, an outer circumferential portion 290 of the second mass body 29 projects with a generally V-shaped cross section. At least a part of the outer circumferential portion 290 of the second mass body 29 functions as an end portion that can be loosely fitted in the groove 28v along the outer circumference of the first mass body 28.

Also in the thus configured centrifugal-pendulum vibration absorbing device 20E, the first mass bodies 28 and the second mass bodies 29 can be configured such that when the first mass body 28 and the second mass body 29 disposed adjacent to each other move with respect to the support member 21E so as to approach each other, an outer circumferential portion (end portion) of the first mass body 28 on the second mass body 29 side and an outer circumferential portion (end portion) of the second mass body 29 on the first mass body 28 side overlap each other as seen from the axial direction of the support member 21 as shown in FIG. 14. This makes it less likely that the behavior of the first mass body 28 and the second mass body 29 becomes unstable and that the first mass body 28 and the second mass body 29 disposed adjacent to each other collide against each other when the first mass body 28 and the second mass body 29 approach each other even if the size of the first mass body 28 and the second mass body 29 is increased in the radial direction, in particular, in order to secure the weight of the first mass body 28 and the second mass body 29. Thus, also in the centrifugal-pendulum vibration absorbing device 20E, the weight of the first mass body 28 and the second mass body 29 can be secured while suppressing a collision between the first mass body 28 and the second mass body 29 disposed adjacent to each other and occurrence of an abnormal sound due to such a collision.

While the embodiment of the present invention has been described above, it is a matter of course that the present invention is not limited to the embodiment in any way, and that the present invention may be modified in various ways without departing from the scope and sprit of the present invention.

The present invention may be applied to the centrifugal-pendulum vibration absorbing device manufacturing industry.

What is claimed is:

1. A centrifugal-pendulum vibration absorbing device, comprising:
   a support member attached coaxially with a rotary element; and
   a plurality of mass bodies swingably coupled to the support member and disposed adjacent to each other in a circumferential direction, wherein
   the plurality of mass bodies are configured such that when a first mass body, which is one of two mass bodies disposed adjacent to each other, and a second mass body, which is the other of the two mass bodies, move with respect to the support member so as to approach each other, the first mass body and the second mass body overlap each other axially along an axial direction of the rotary element.

2. The centrifugal-pendulum vibration absorbing device according to claim 1, wherein
   a recessed portion is formed at an end portion of the first mass body on a side of the second mass body, the recessed portion opening at least on an outer circumferential side, an inner circumferential side, and the side of the second mass body as seen from a radial direction, and an end portion of the second mass body on a side of the first mass body is formed so as to be loosely fitted in the recessed portion of the first mass body.

3. The centrifugal-pendulum vibration absorbing device according to claim 1, wherein
   the first mass body includes a weight in which a gap is formed at at least an end portion of the weight on the side of the second mass body, and an end portion of the second mass body on the side of the first mass body is loosely fitted in the gap of the first mass body when the first mass body and the second mass body move with respect to the support member so as to approach each other.

4. The centrifugal-pendulum vibration absorbing device according to claim 1, wherein
   the first mass body includes two weights coupled to each other in the axial direction such that a gap is formed at least an end portion of the first mass body on the side of the second mass body.

5. The centrifugal-pendulum vibration absorbing device according to claim 3, wherein
   the second mass body is formed by two weights coupled to each other in the axial direction, and an end portion of one of the two weights on the side of the first mass body is loosely fitted in the gap of the first mass body.

6. The centrifugal-pendulum vibration absorbing device according to claim 3, wherein
   the weight is swingably coupled to the support member via an arm member.

7. The centrifugal-pendulum vibration absorbing device according to claim 6, wherein
   a stopper portion that abuts against the arm member to prescribe a swing range of each of the mass bodies is formed on the support member.

8. The centrifugal-pendulum vibration absorbing device according to claim 1, wherein
   all of the plurality of mass bodies have the same weight as each other, and the first mass body and the second mass body have different structures from each other.

9. The centrifugal-pendulum vibration absorbing device according to claim 1, wherein
   all of the plurality of mass bodies have the same structure and weight as each other.

10. The centrifugal-pendulum vibration absorbing device according to claim 1, wherein
    an end portion of the first mass body on the side of the second mass body and an end portion of the second mass body on the side of the first mass body overlap each other at all times as seen from the axial direction.

11. The centrifugal-pendulum vibration absorbing device according to claim 1, wherein
    the support member is connected to a rotary element of a damper mechanism disposed between an input member coupled to a motor and an input shaft of a speed change device.

\* \* \* \* \*